United States Patent
Schiller

(10) Patent No.: US 12,375,339 B2
(45) Date of Patent: Jul. 29, 2025

(54) FREQUENCY DOMAIN I/Q BALANCE COMPENSATION, EQUALIZATION AND RESAMPLING

(71) Applicant: Associated Universities, Inc., Washington, DC (US)

(72) Inventor: Matthew William Schiller, New Hartford, NY (US)

(73) Assignee: Associated Universities, Inc., Vienna, VA (US)

( * ) Notice: Subject to any disclaimer, the term of this patent is extended or adjusted under 35 U.S.C. 154(b) by 53 days.

(21) Appl. No.: 18/501,633

(22) Filed: Nov. 3, 2023

(65) Prior Publication Data
US 2024/0364573 A1   Oct. 31, 2024

Related U.S. Application Data

(60) Provisional application No. 63/498,321, filed on Apr. 26, 2023.

(51) Int. Cl.
H04L 27/38  (2006.01)

(52) U.S. Cl.
CPC ................................. H04L 27/3863 (2013.01)

(58) Field of Classification Search
CPC .................................................... H04L 27/3863
See application file for complete search history.

(56) References Cited

U.S. PATENT DOCUMENTS

| 5,872,538 A | 2/1999 | Fowler | |
| 9,130,626 B2 * | 9/2015 | Gotman | H04B 1/0475 |
| 9,184,975 B1 | 11/2015 | Liou et al. | |
| 9,306,782 B2 * | 4/2016 | An | H04L 27/2276 |
| 10,951,251 B2 * | 3/2021 | Nayebi | H04B 1/1027 |
| 2016/0285669 A1 * | 9/2016 | Saito | H04L 27/206 |

OTHER PUBLICATIONS

Kong-Pang Pun, J. E. Franca and C. Azeredo-Leme, "Wideband digital correction of I and Q mismatch in quadrature radio receivers," 2000 IEEE International Symposium on Circuits and Systems (ISCAS), 2000, pp. 661-664 vol.5, doi: 10.1109/ISCAS.2000.857556.

Morgan, M., & Fisher, "Experiments with Calibrated Digital Sideband-Separating Downconversion" J. R. Mar. 2010, PASP, 122, 326 (https://iopscience.iop.org/article/10.1086/651525/pdf).

Fisher, J. R., & Morgan, M. A. 2008, National Radio Astronomy Observatory Electronics Division Internal Report No. 320 (Charlottesville: NRAO).

Guanbin Xing, Manyuan Shen and Hui Liu, "Frequency offset and I/Q imbalance compensation for direct-conversion receivers," in IEEE Transactions on Wireless Communications, vol. 4, No. 2, pp. 673-680, Mar. 2005, doi: 10.1109/TWC.2004.842969.

Ellingson, S.W. "Correcting I-Q Imbalance in Direct Conversion Receivers," Feb. 10, 2003.

Hibner, Rafal et al. "Frequency Dependent Mismatch Correction Scheme for Zero-IF Receivers," Intl. Journal of Electronics and Telecommunications, 2018, vol. 64, No. 1, pp. 13-18.

\* cited by examiner

*Primary Examiner* — Dac V Ha
(74) *Attorney, Agent, or Firm* — Remenick PLLC

(57) ABSTRACT

Spurious signals in a receiver are rejected using a method of correcting amplitude and phase imbalances in the received signal. A system implementing the method can be built into the receiver or can be used during assembly of the receiver.

20 Claims, 12 Drawing Sheets

Initial I/Q Balance Coefficient Generation

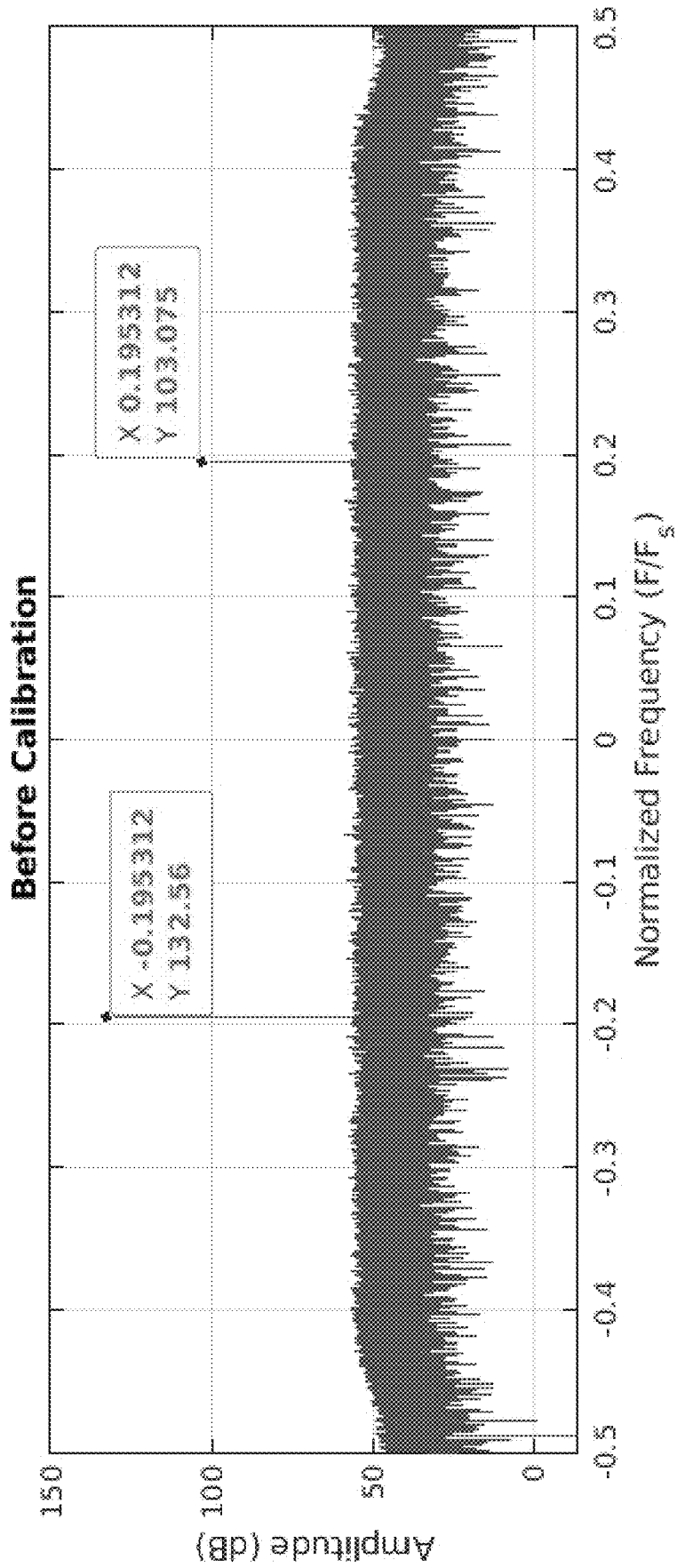
Figure 1a: I/Q Calibration Example

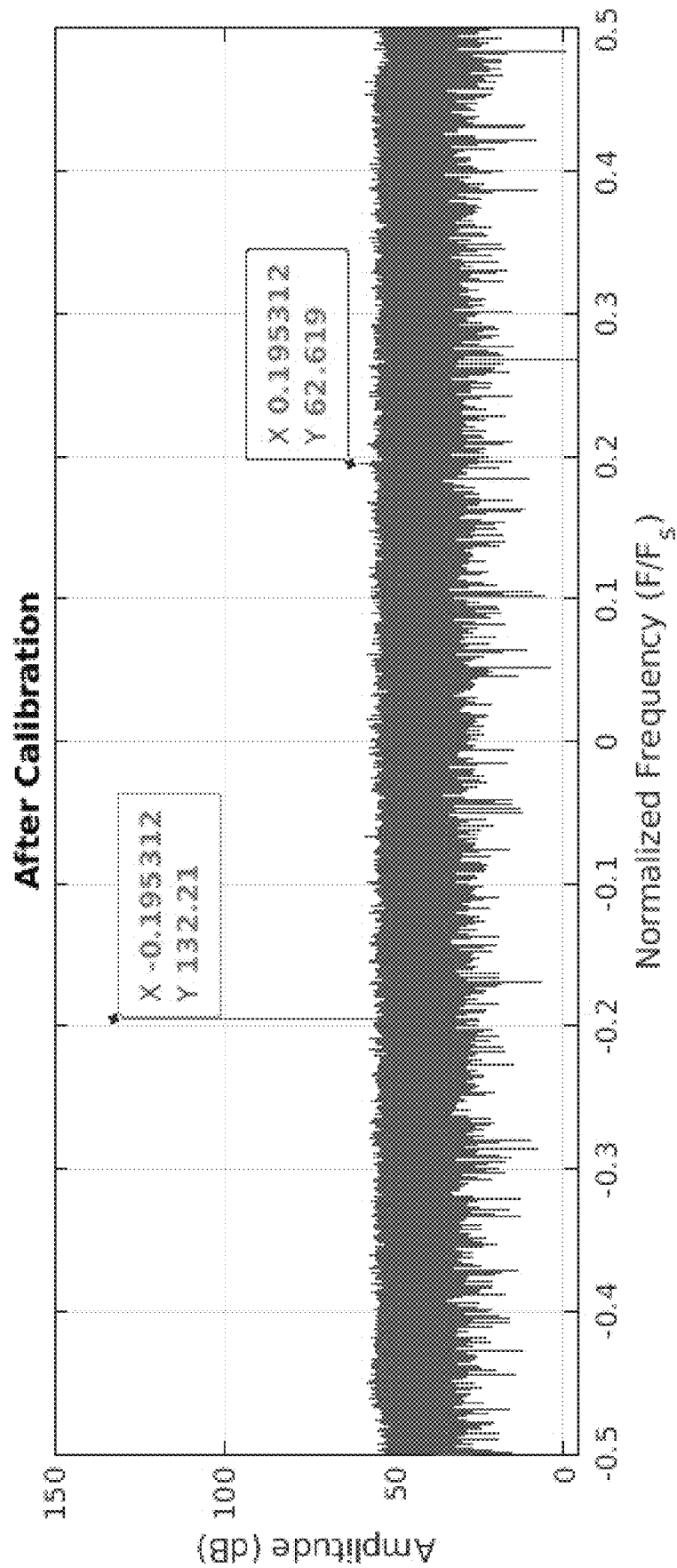
Figure 1b: I/Q Calibration Example

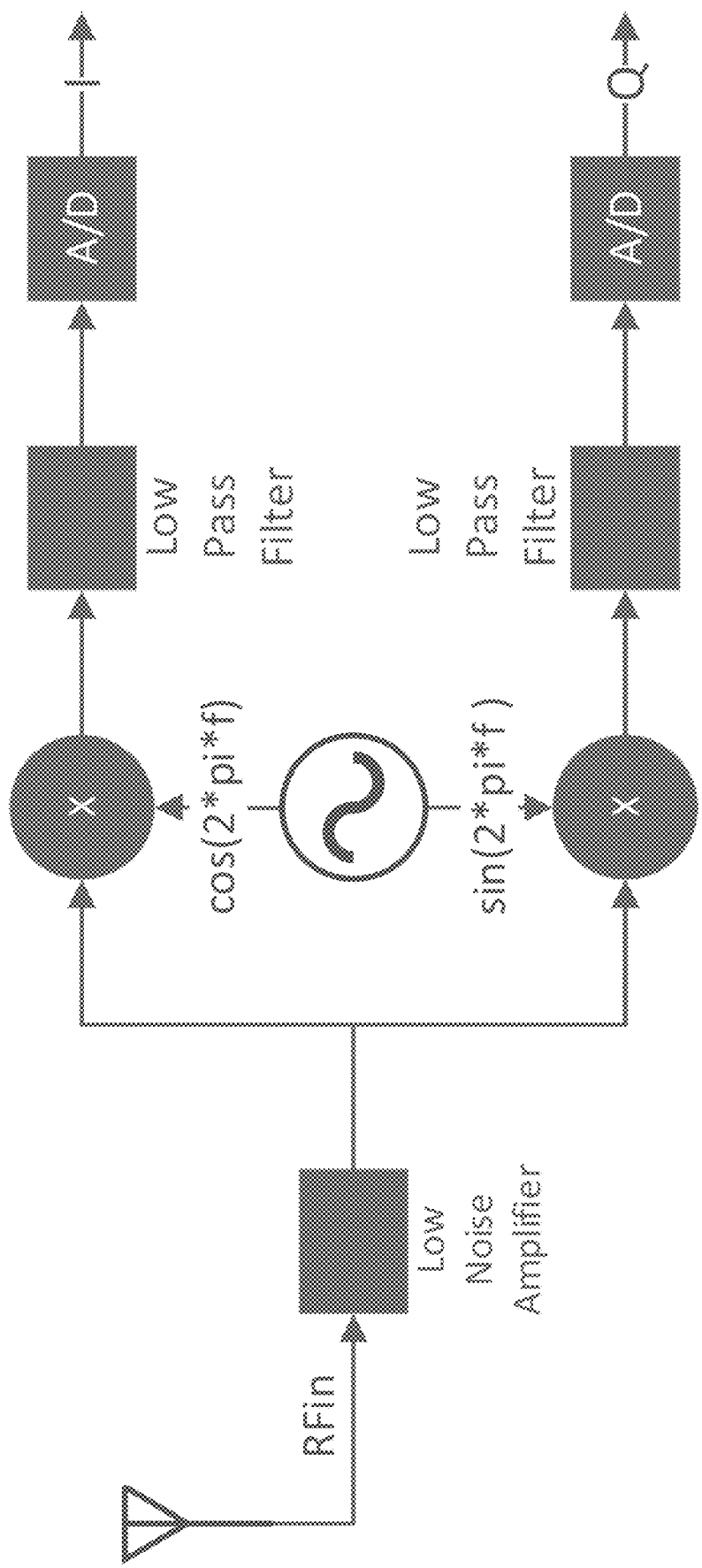
Figure 2: Zero-IF Direct Conversion Receiver Block Diagram

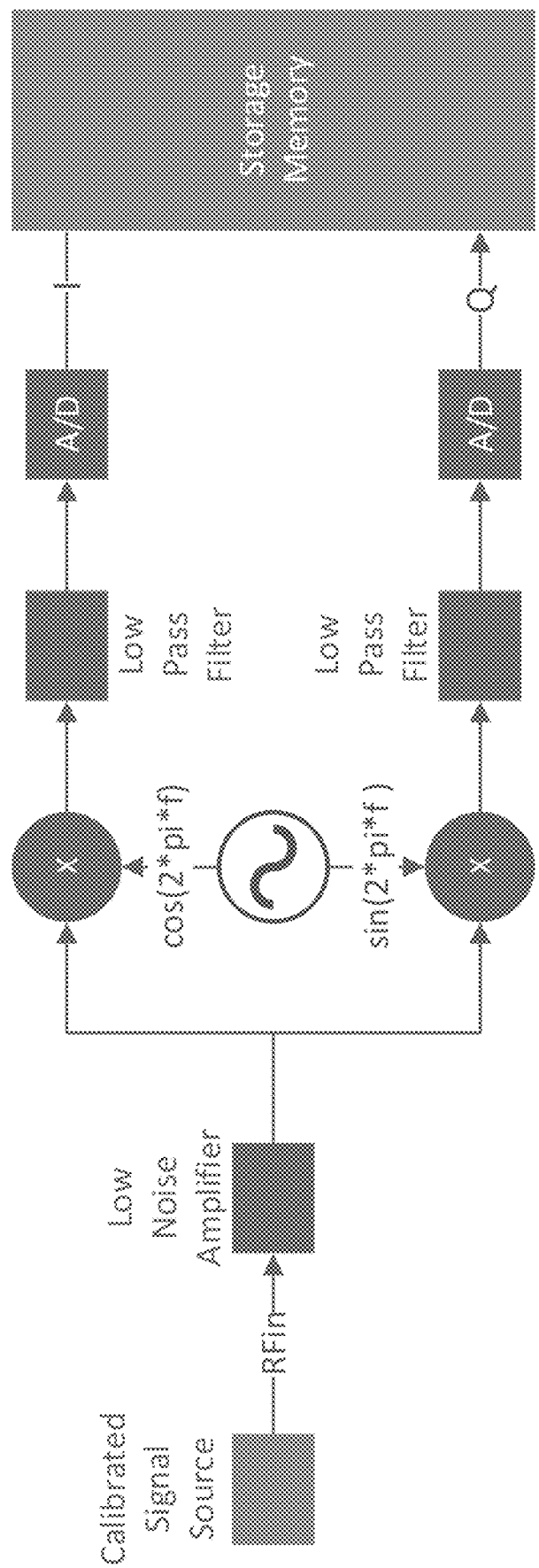
Figure 3: Calibration Test Setup

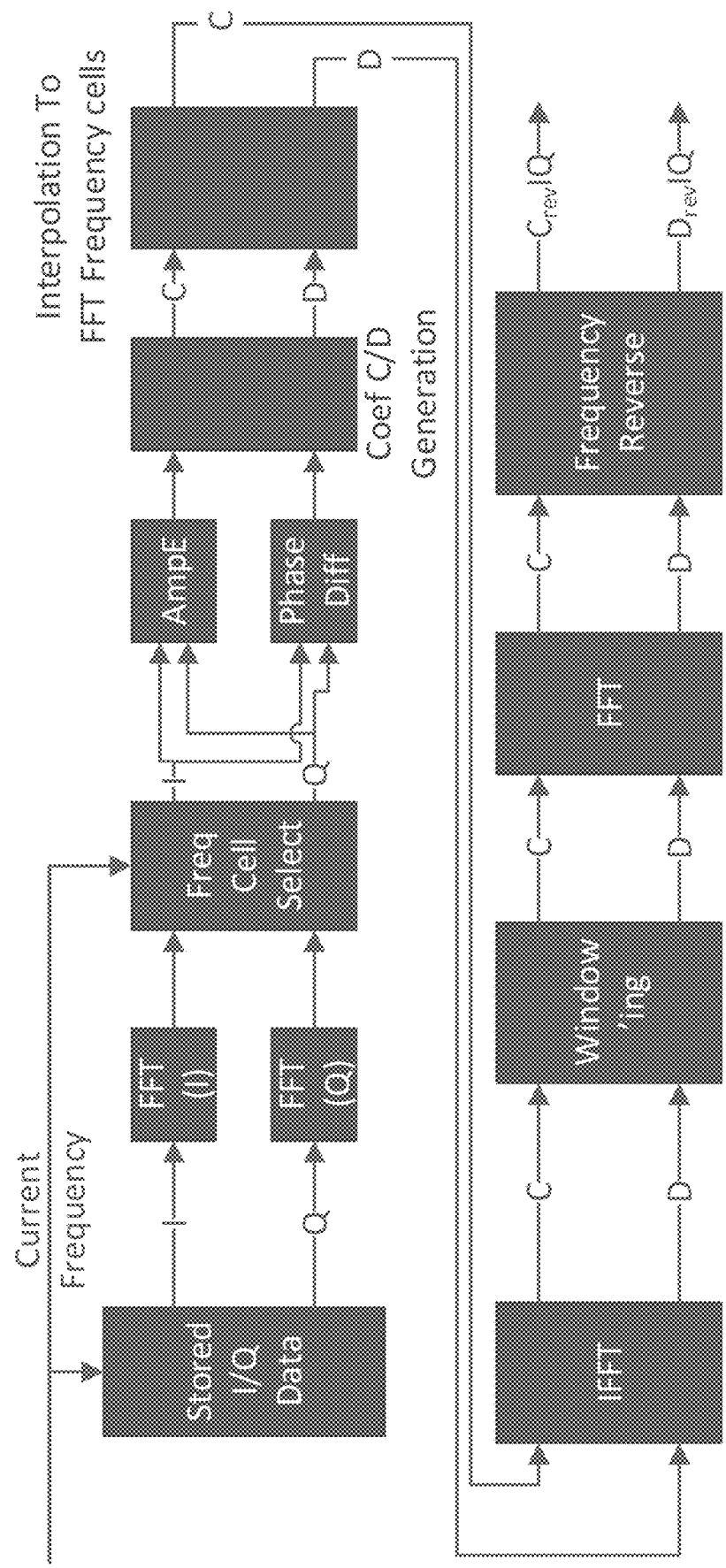
Figure 4: Initial I/Q Balance Coefficient Generation

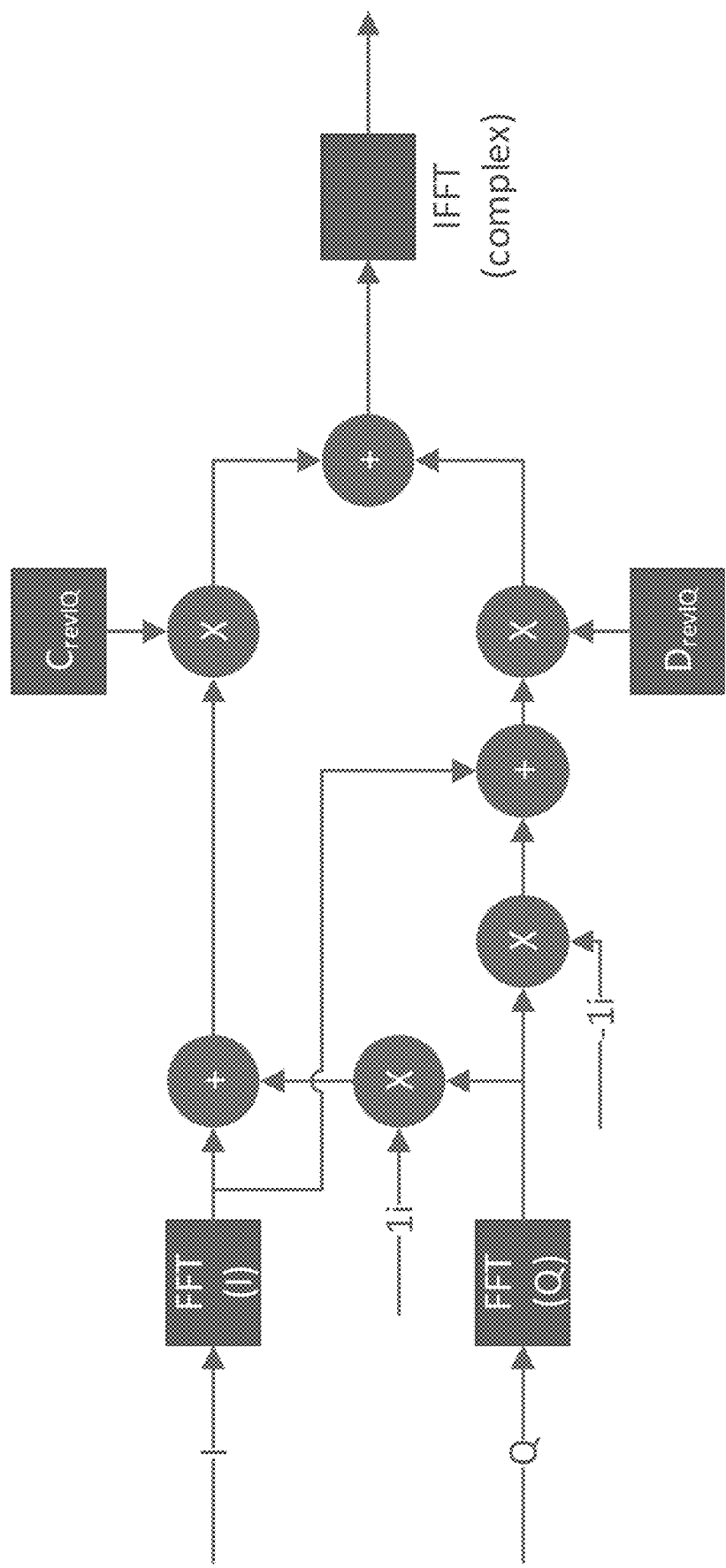
Figure 5: Application of C/D Coefficients

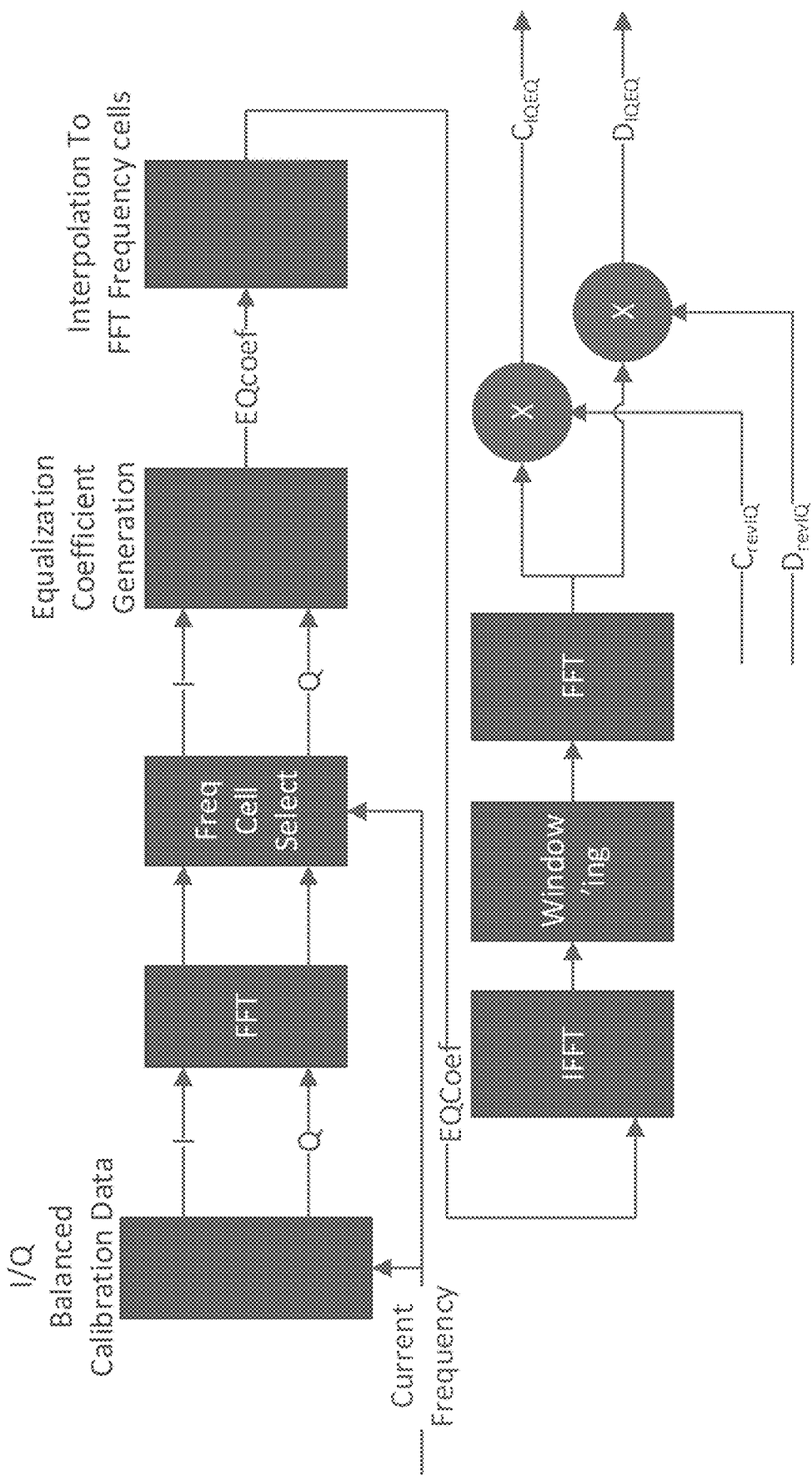
Figure 6: Equalization Coefficient Modification

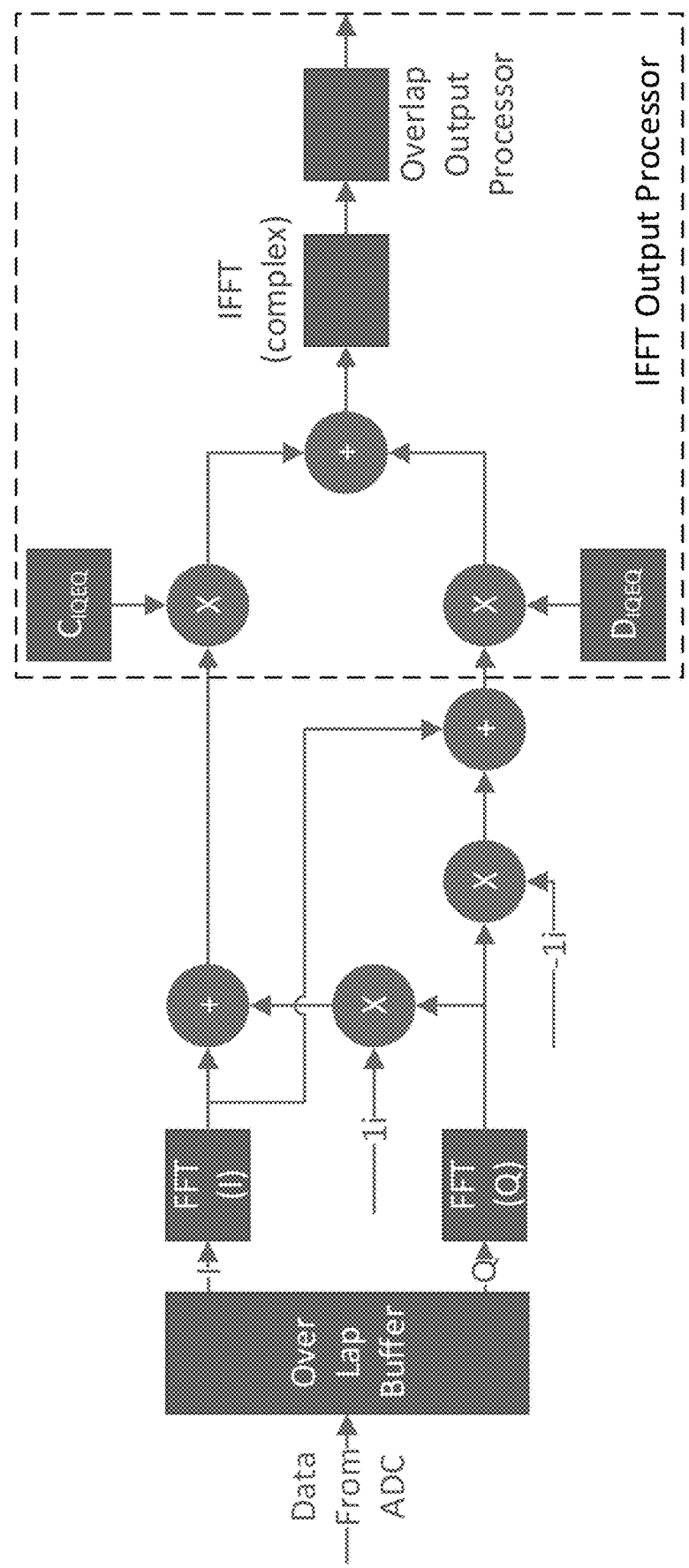
Figure 7: Implementation of Calibration Data

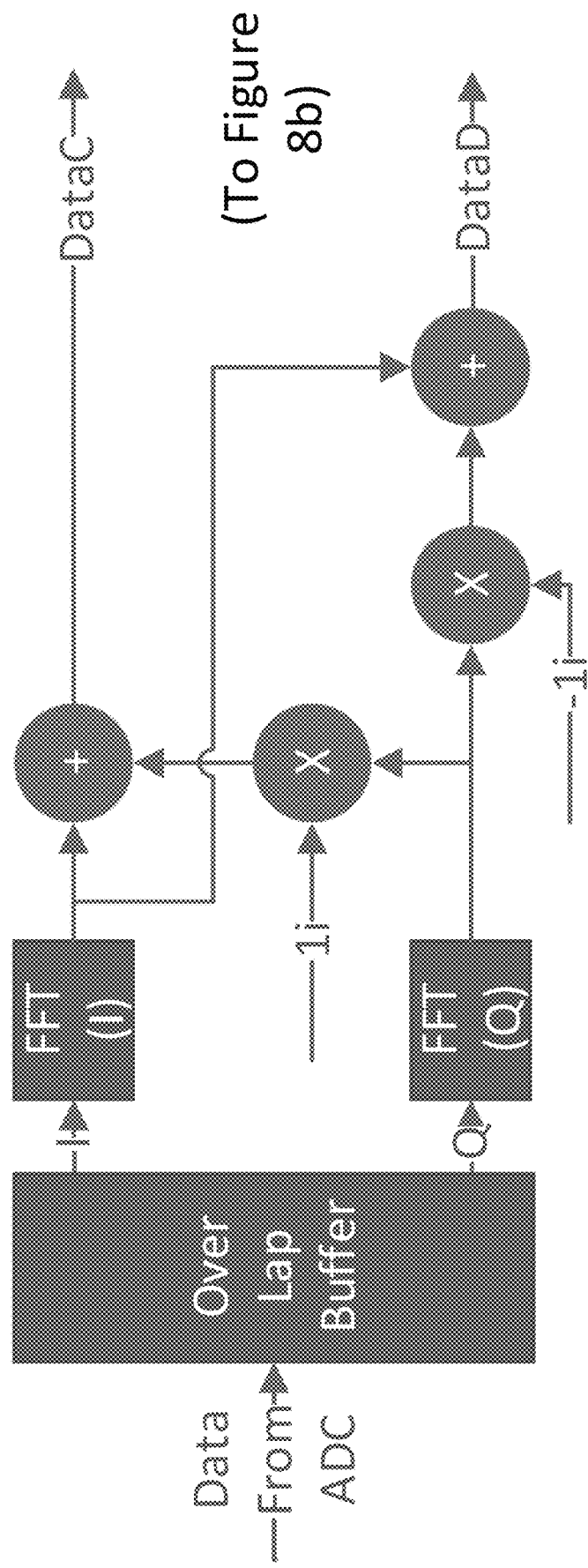
Figure 8a: Processing Multiple Channels (FFT Stage)

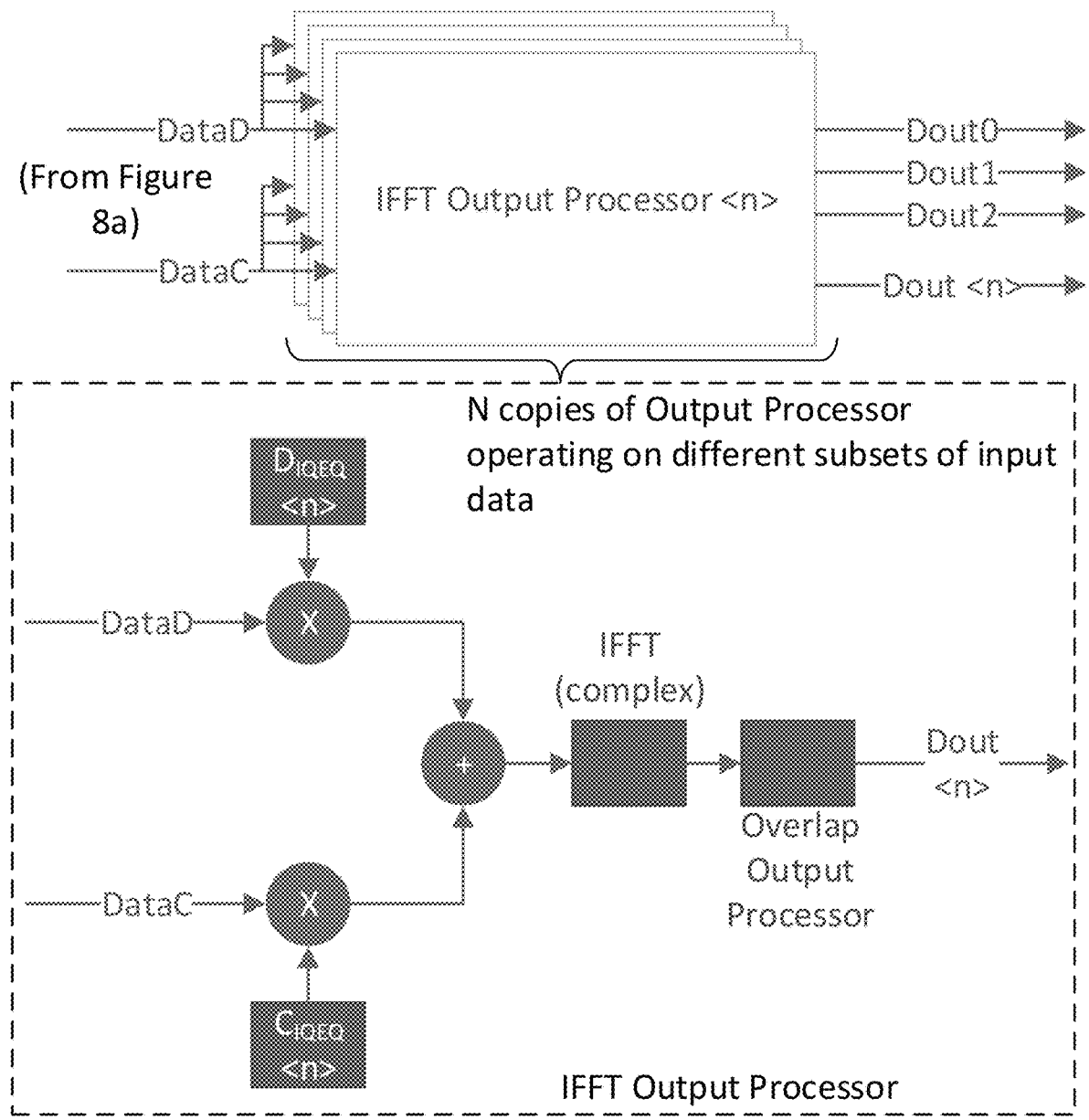
Figure 8b: Processing Multiple Output Channels (IFFT Output Processors)

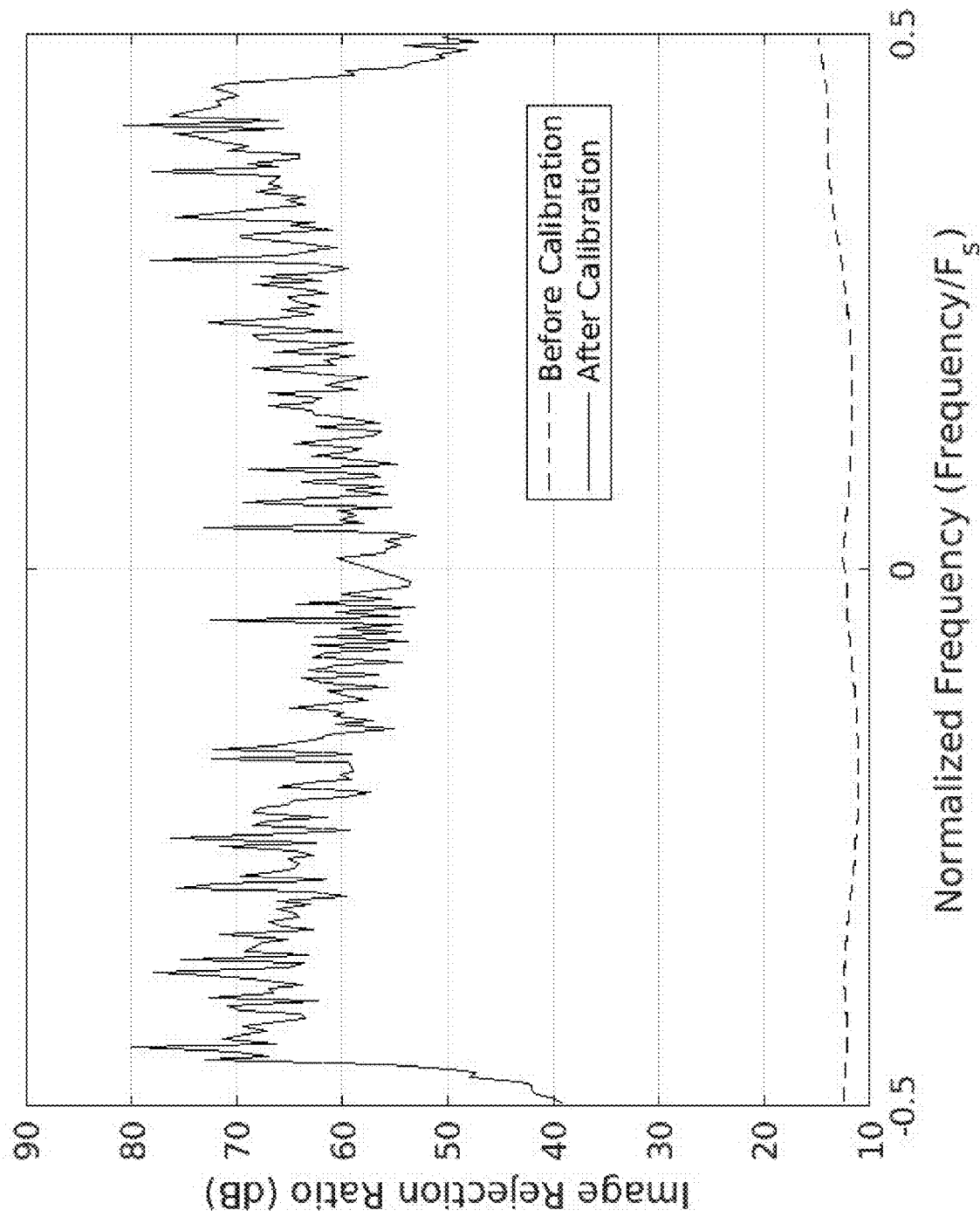
Figure 9: Image Rejection Ratio Improvement through Calibration

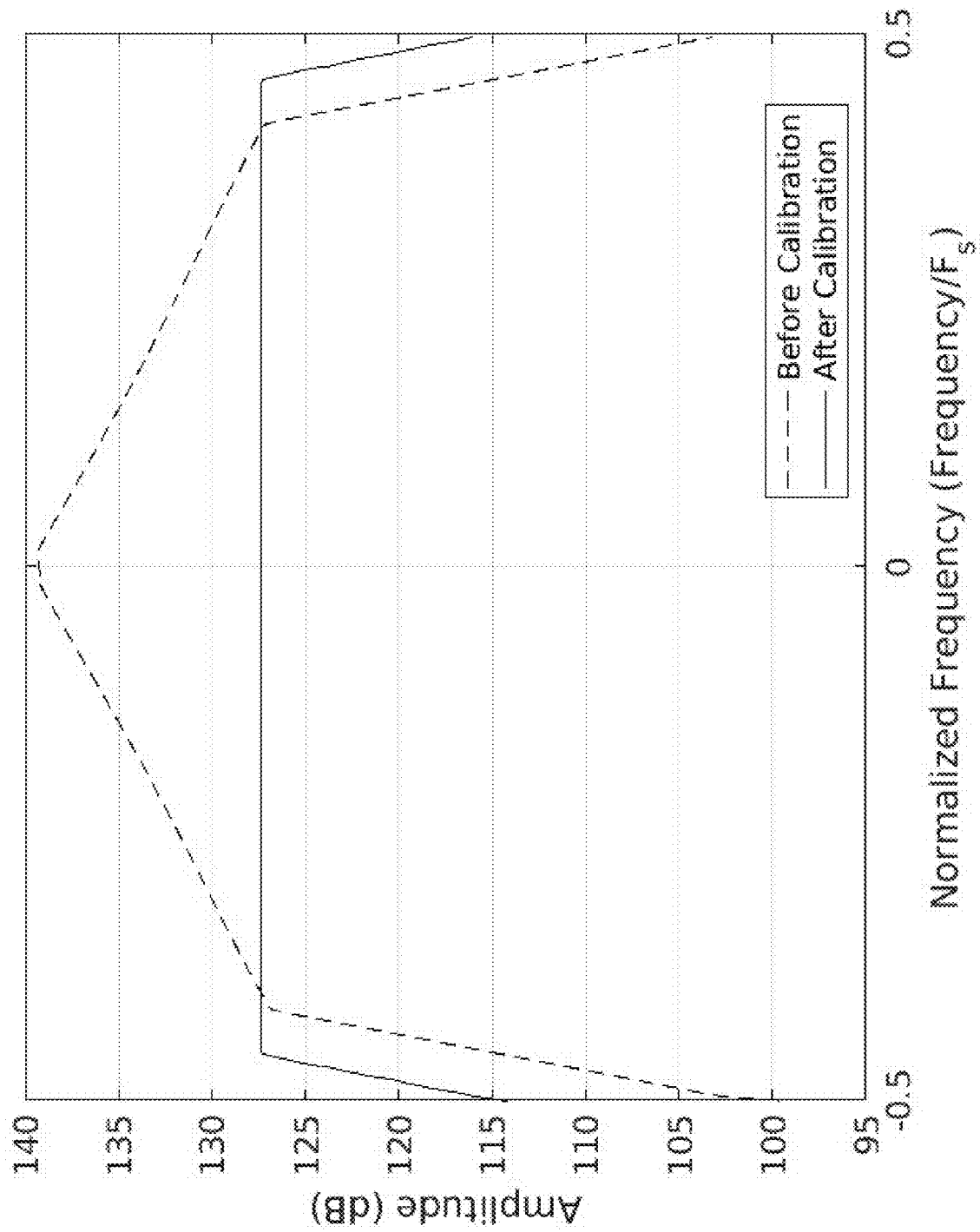
Figure 10: Amplitude Flatness Improvement through Calibration

FREQUENCY DOMAIN I/Q BALANCE COMPENSATION, EQUALIZATION AND RESAMPLING

REFERENCE TO RELATED APPLICATIONS

This application claims priority to U.S. Provisional Application No. 63/498,321, filed Apr. 26, 2023, entitled "Frequency Domain I/Q Balance Compensation, Equalization and Resampling," and hereby specifically and entirely incorporated by reference.

RIGHTS IN THE INVENTION

This invention was made with government support under Cooperative Agreement AST-1925090, between the National Science Foundation and Associated Universities, Inc., and, accordingly, the United States government has certain rights in this invention.

BACKGROUND

1. Field of the Invention

The invention is directed to systems and methods of correcting I/Q balance. Specifically, the invention is directed to systems and methods of rejecting spurious signals by correcting amplitude and phase imbalances.

2. Background of the Invention

The next generation Very Large Array (VLA) radio telescope is a proposed radio telescope array with over 40 GHz of instantaneous bandwidth and over 70 GHz of total bandwidth. Its extensive science goals push the available technology to implement successfully. The proposed radio receiver architecture uses zero-IF down conversion to allow available analog to digital converters to be used to digitize the wide spectrum of operation. However, to meet the aggressive science goals of the telescope spurious signals must be kept to a minimum. Sidebands require at least 40 dB of separation and as much as 80 dB is desirable when a strong terrestrial interferer signal is present. This is not achievable with analog-only calibration of the receiver. Instead, a digital correction mechanism is needed. However, with data sampled at 7 GSPS (or even faster), an implementable and cost-effective digital architecture capable of real-time operation is desirable. The existing techniques using Finite Impulse Response (FIR) filters are not effective.

A Direct-Conversion or Zero-IF (intermediate frequency) receiver as depicted in FIG. 1, is subject to a wide variety of non-linearities that cause spurious responses in the digitized I/Q (in-phase/quadrature) data stream. These issues can include:

Amplitude differences in the SIN and COS Local Oscillator outputs
Phase error between the Oscillator 0 degree (cosign) and 90 degree (sin) output.
Amplitude differences between the Low Pass Filter in the I and Q paths.
Time-delay differences in the I and Q paths.
Mixer non-linearities
Analog to Digital encoding differences including offset and gain and linearity.

In addition, the paths may include differences in response that vary with frequency, which may be in-common to both paths and also needs to be corrected for optimal receiver operation.

Regardless of the source for the error a common error model for a sine wave input (which by extension can represent other signal types) is the following:

$$I(t) = \rho\cos(2*pi*f*t) \quad \text{(Eq1)}$$

$$Q(t) = \rho\gamma\sin(2*pi*f*t+\varphi) \quad \text{(Eq 2)}$$

Where $\rho$ is a complex frequency dependent multiplier representing the common amplitude and phase irregularities on both channels, $\gamma$ represents the frequency dependent amplitude error between I and Q, and $\varphi$ represents the frequency dependent phase error between I and Q. For frequency dependency, all of these error terms thus become functions of frequency (and potentially temperature and process).

For I/Q compensation, the desired compensation is to find the appropriate frequency dependent compensation that removes $\gamma$ and $\varphi$, which will result in I/Q behaving identically. As has been shown in the prior art, such as U.S. Pat. No. 9,184,975 (the '975 patent), a frequency domain version of suitable calibration coefficients can be created by finding the transfer function of the I/Q imbalance, that is the "corrupting" function A that converts an I/Q balanced signal into the received I/Q imbalanced signal $$A = \begin{matrix} A_{11} & A_{12} \\ A_{21} & A_{22} \end{matrix} \quad \text{(Eq 3)}$$

Where $A_{11} = 1$; $A_{12} = 0$; $A_{21} = \gamma \sin(\varphi)$; $A_{22} = \gamma \cos(\varphi)$ The inverse of Matrix A can thus be written as Matrix B:

$$B = \begin{matrix} B_{11} & B_{12} \\ B_{21} & B_{22} \end{matrix} \quad \text{(Eq 4)}$$

Where $B_{11} = 1$; $B_{12} = 0$; $B_{21} = \gamma \sin(\varphi)$; $B_{22} = 1/(\gamma \cos(\varphi))$ where $\gamma$ and $\varphi$ are amplitude and phase mismatches, respectively, at frequency f.

As in the '975 patent, these matrix operations can be rewritten as:

$$Z_{out} = CZ_{in} + DZ_{in}^* \quad \text{(Eq 5)}$$

Where $C = \dfrac{(B_{11} - (1i)B_{12} + (1i)B_{21} + B_{22})}{2}$ and $D = \dfrac{(B_{11} + (1i)B_{12} + (1i)B_{21} - B_{22})}{2}$ C and D remain functions of frequency and rely on a quasi-linear model. In the '975 patent these frequency domain coefficients were immediately translated back to the time domain and applied to the input data using a complex FIR filter.

There are multiple problems with this approach. First, the '975 patent did not address issues that can result from edge-effects in frequency domain coefficients generated in this way (sometimes called the "Gibbs" phenomenon). When developing FIR filter coefficients using the frequency domain, it is common practice to window the coefficients to ensure that the time domain response is in fact time-limited, as required by a FIR filter implementation. Some transfer functions for a hybrid or low pass filter built in analog electronics can exhibit an infinite impulse response, so only an approximation can be generated accurately in a FIR filter implementation. But second, the Prior Art did not address the additional "in-common" error function depicted by p in equation 1 and equation 2. And finally, the '975 patent uses a processor inefficient FIR filter architecture which is unimplementable in some processing architectures and at high sample rates.

SUMMARY OF THE INVENTION

The present invention overcomes the problems and disadvantages associated with current strategies and designs and provides new tools and methods of allowing analog to digital converters to be used to digitize a wide bandwidth of the Radio Frequency spectrum.

One embodiment of the invention is directed to a method for correcting spurious signals in a receiver. The method comprises the steps of: obtaining an original radio frequency (RF) signal, in the frequency domain, measuring in-phase (I) and quadrature (Q) signals at a plurality of frequencies within the original RF signal, recording I/Q imbalances in a memory storage device, calculating preliminary I/Q balance calibration coefficients based on the recorded I/Q imbalances, determining a complex value for both the I and Q signals at each calibration frequency, wherein the complex values represent an amplitude and phase of both the I and Q signals, determining a frequency-dependent vector function at each calibration frequency, converting the frequency-dependent vector functions to the time-domain, obtaining time-domain coefficients from the converted frequency-dependent vector functions, converting the time-domain coefficients back to the frequency domain, frequency reversing the frequency-dependent vector functions, determining a frequency domain representation of an I/Q balance corrected estimation of the original signal, and correcting amplitude and phase variation in the receiver based on the I/Q balance corrected estimation of the original signal.

In a preferred embodiment, a known continuous wave (CW) signal is used in calculating the preliminary I/Q balance calibration coefficients. Preferably, the step of determining a complex value for both the I and Q signals is accomplished using real-valued Fast Fourier Transforms (FFTs). Preferably, a sinusoid of each calibration frequency is used to select a calibration point from frequency domain data. The step of determining a complex value for both the I and Q signals at each calibration frequency is preferably interpolated and extended to cover the FFT frequency range.

Preferably, the frequency-dependent vector functions are converted to the time-domain using Inverse Fast Fourier Transform (IFFT). In a preferred embodiment, the step of obtaining time-domain coefficients is accomplished with a window function that time-limits the data. Preferably, an FFT, an overlap-and-save algorithm, or an overlap-and-add algorithm is used to determine the I/Q balance corrected estimations of the original signal.

The method preferably further comprises determining frequency dependent amplitude variation and/or phase variation of the original signal and correct for the variations. The method preferably further comprises calculating equalization coefficients and determining calibration coefficients for processing and correcting the variations in the signals. Preferably, the method further comprises converting a data rate by modifying the equalization coefficients to zero outside a desired passband. In a preferred embodiment the method further comprises channelizing data by calculating the equalization coefficients for a full input passband. Preferably, multiple sets of equalization coefficients are used to implement a set of desired output channels.

In a preferred embodiment, the method further comprises processing data from an analog to digital converter with the corrected amplitude and phase variation of the receiver. Preferably, the data is processed with a Finite Impulse Response (FIR) filter using an overlap-and-save or overlap-and-add algorithm. The method preferably further comprises one of processing the corrected data in the frequency domain or converting the data back to the time domain.

Another embodiment of the invention is directed to a system for correcting spurious signals in a receiver. The system comprises a radio frequency signal source, a receiver adapted to receive the calibrated signal source, a memory storage device, and a processor adapted to implement the methods described herein.

Preferably, the processor is built into the receiver. In another preferred embodiment, the processor is external to the receiver and calibration is completed during assembly of the receiver. Preferably, the receiver is a Zero-IF direct conversion receiver.

Other embodiments and advantages of the invention are set forth in part in the description, which follows, and in part, may be obvious from this description, or may be learned from the practice of the invention.

DESCRIPTION OF THE DRAWING

The invention is described in greater detail by way of example only and with reference to the attached drawing, in which:

FIG. 1 depicts a Zero-IF direct conversion receiver.

FIG. 2A depicts an example of normalized frequency before IQ calibration.

FIG. 2B depicts an example of normalized frequency after IQ calibration.

FIG. 3 depicts an embodiment of a calibration test setup.

FIG. 4 depicts an embodiment of an initial I/Q balance coefficient generation.

FIG. 5 depicts an embodiment of an application of C/D coefficients.

FIG. 6 depicts an embodiment of an equalization coefficient modification.

FIG. 7 depicts an embodiment of an implementation of calibration data.

FIGS. 8A-B depict an embodiment of a system for processing multiple channels.

FIG. 9 depicts example data of image rejection ratio improvement through calibration.

FIG. 10 depicts example data of amplitude flatness improvement through calibration.

DESCRIPTION OF THE INVENTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention Direct conversion baseband (Zero-IF) receivers have become a popular architecture due to the simple hardware requirements and the availability of high-speed analog to digital converters. This architecture is one method for extending an Analog to Digital Converter's (ADC) bandwidth beyond the normal one half of the sampling frequency. By digitizing two related signals the effective bandwidth of the ADC is doubled. However, zero-IF architectures suffer from poor sideband separation. A signal at 10 MHz above the carrier frequency may cause a spurious signal at 10 MHz below the carrier as shown in FIG. 2A. This is caused by amplitude and phase variances between the in-phase (I) and quadrature (Q) signal paths in the baseband receiver. It has surprisingly been discovered that correcting these amplitude and phase imbalances allows a receiver to reject the spurious signals. By doing the corrections in the frequency-domain, substantially fewer processing resources are needed. Further the same structure can be used to implement amplitude equalization and even to resample the signal to a different sample rate if required by the application. Combining these functions together further optimizes processor utilization allowing for power, size and cost optimization. By combining multiple functions together and operating in the frequency domain substantial resources are saved in the target processor (i.e., FPGA, ASIC, CPU, or GPU) allowing higher bandwidth processing to be feasible.

In the present invention, in addition to applying the coefficients in the frequency domain, the common frequency dependent amplitude and phase disruptions defined by p in equation 1 and 2 are also addressed. To accomplish that, the frequency dependent I/Q imbalance is first addressed on measured data representing the corrupted I/Q samples. The I/Q imbalance can be measured at a variety of frequency points by sweeping a known amplitude Continuous Wave (CW) signal across the desired frequency range and recording the corrupted digital complex data into a memory storage device as shown in FIG. 3. By sweeping the desired frequency range the algorithm described herein is preferably able to correct the frequency dependent imbalances and equalization flatness over that range. However, to accomplish that, the coefficients must be developed in stages. First, the I/Q balance is addressed, and after I/Q balance is corrected then the transfer function is equalized to correct for ρ.

After the I/Q balance is corrected, the common amplitude and phase variation, as represented by ρ, can be measured and an inverse function estimate can be generated. By the principal of linearity, these coefficients can then be combined by simple multiplication in the frequency domain (which would have been convolution in the time-domain). The resulting coefficients approximate the function needed to undo the original corrupting functions represented by ρ, γ, and φ.

Data from the uncorrected system is recorded using the test apparatus shown in FIG. 3. This test apparatus could be built into a device that uses the system, in which case calibration can be repeated in the target hardware, or calibration can be done during assembly of the radio receiver using standard test equipment. Once uncorrected data is recorded, off-line calculations can be done to implement the calibration algorithm as described herein resulting in preliminary I/Q balance calibration coefficients. The set of calibration data is recorded with the calibrated signal source tuned to a set of discrete frequency CWs that cover the desired operating range of the receiver. The known frequency of the CW is also recorded and can be used during the calibration process.

First stored calibration data is separated into I and Q components and processed separately by real-valued Fast Fourier Transforms (FFTs) at each calibration frequency. The frequency of the current calibration sinusoid is used to select the calibration point from the frequency domain data in the FreqCell Select block (see FIG. 4). This results in single complex value for both the I and Q paths representing the amplitude and phase of both the I and Q signals at the current calibration frequency. The following values are then calculated:

$$\text{Amp}_E = \frac{\text{abs}(\textit{fftdata}_q)}{\text{abs}(\textit{fftdata}_i)} \quad \text{(Eq 6)}$$

$$\text{Phasediff} = \frac{\pi}{2} - \text{Angle}(\textit{fftdata}_i) - \text{Angle}(\textit{fftdata}_q) \quad \text{(Eq 7)}$$

These values are then used to form C and D as in equation 4 and 5 in the Coef C/D Generation block. The process is then preferably repeated over each calibration frequency to form the full C/D vector at each measured calibration frequency.

Since it's not always practical to take a calibration measurement at every FFT bin frequency, the resulting frequency-dependent C/D vectors are preferably interpolated and extended to cover the full FFT frequency range and can be sampled at the exact frequencies corresponding to FFT bin center frequencies. This data is then returned to the time-domain using the Inverse Fast Fourier Transform (IFFT). A window (or taper) function is applied to ensure that the data is time-limited and the resulting time-domain coefficients are then returned to the frequency domain using the FFT Algorithm.

$$C_{windowed}(F) = FFT(IFFT(C(F)) * \text{Window}(t)) \quad \text{(Eq. 8)}$$

$$D_{windowed}(F) = FFT(IFFT(D(F)) * \text{Window}(t)) \quad \text{(Eq. 9)}$$

The C/D vector are then frequency reversed by application of Equations 10 and 11:

$$C_{revIQ}(F) = C_{windowed}(-F) \quad \text{(Eq. 10)}$$

$$D_{revIQ}(F) = D_{windowed}(-F) \quad \text{(Eq. 11)}$$

To correct for amplitude and phase variation with frequency, as represented by ρ, I/Q balance should first be corrected. The I/Q balance coefficients are applied on a trial basis to the stored calibration data which is accomplished by the circuit depicted in FIG. 5. The trial application can be accomplished offline from the final real-time system. This circuit first takes the FFT of a block of data. Either a normal FFT version or an overlap-and-save version could be used since the coefficients are preferably properly formatted for the overlap-and-save algorithm. The I/Q data is preferably processed separately initially. The C and D coefficient sets (which are functions of frequency), get applied according to the following formula:

$$IQ_{temp}(F) = \quad \text{(Eq. 12)}$$
$$C_{revIQ} * (FFT_I - (1i)(FFT_q)) + D_{revIQ} * (FFT_I - (1i) * FFT_q)$$

$$IQ_{temp}(T) = IFFT(IQ_{temp}) \quad \text{(Eq. 13)}$$

The result, $IQ_{temp}$ (F), is the frequency domain representation of an I/Q balance corrected estimation of the original signal. When used to process more data than the length of one FFT (which is selected for desired performance of the calibration algorithm), the overlap-and-save algorithm can also be used to process long or even infinite input sequences. By taking the IFFT of $IQ_{temp}$ (F), and, if needed, selecting the proper cells to keep according to the overlap-and-save (or -add) algorithm, I/Q balanced time domain samples are generated.

An optional next step is to determine the frequency dependent amplitude (and optionally phase if a phase stable signal source was used for calibration) variation. This variation typically represents the transfer function of the receiver with frequency (represented as p in equation 1 and 2) and is typically caused by amplitude ripple or drop off in the low-pass filter, but can also be caused by filtering effects of the transmission line or the mixer used. This ripple can cause signal distortion and lower receiver performance. In some receivers (e.g. Communication, Radar or Interferometers), it is desirable to equalize the passband to a flat response, which can be done by choosing a frequency where the amplitude (or amplitude and phase) is the desired response and then create frequency dependent corrections to modify the amplitude (or rotate the phase) such that the same response is observed at all frequencies. This has the effect of calculating an estimation of the inverse of p.

To calculate the inverse of p, first the I/Q imbalance is removed from the calibration data. Next, since the input amplitude (and optionally phase) is known to be constant, the corrected calibration data can be further processed. The data is once again transformed into the Frequency domain. Amplitude measurements are made at each calibration frequency by finding the relevant FFT bin, similar to how the C/D coefficients were generated as described herein. Here one particular frequency cell is determined to be the ideal output value (for example, the lowest, maximum, or median amplitude cell in the passband could be selected), this frequency cell is determined to have a complex amplitude scaler of 1+0i, while all the remaining are scaled appropriately:

$$FFT_{eq}(F) = IFFT(IQtemp(T)) \quad \text{(Eq 14)}$$

$$Ref_{cell} = FFT_{eq}(f) \text{ at some } f \text{ (Minimum, maximum, etc.)} \quad \text{(Eq 15)}$$

$$\widetilde{\rho^{-1}}(F) = \frac{FFT_{amp}}{Ref_{cell}} \text{ or } \frac{abs(FFT_{amp})}{abs(Ref_{cell})} \quad \text{(Eq 16)}$$

Once the estimate for the inverse of $\rho$ ($\widetilde{\rho^{-1}}$) is calculated, $\widetilde{\rho^{-1}}$ can be interpolated to all FFT cells and windowed similarly to how C/D is processed, as described herein. Finally, the windowed and equalized frequency domain coefficients for equalization are multiplied with the $C_{revIQ}$ and $D_{revIQ}$ to form the final C/D Coefficients ($C_{IQEQ}$ and $D_{IQEQ}$) that can be used within the system to process and correct normal system signals. This final generation of calibration coefficients is shown in FIG. 6. It should be noted that this calibration is not dependent on a particular input waveform during normal system operation.

Once coefficients are generated for a particular FFT and overlap size offline, the online system processes data using the overlap-and-save (or overlap-and-add) algorithm to implement FIR filtering on continuous input data in the frequency domain. This algorithm processes blocks of streaming data from an analog to digital converter (or pre-stored input data) in overlapping blocks. Each block overlaps by the equivalent length of the emulated FIR filter. The preferred overlap is approximately ⅛, so if an 8192 length FFT is used the equivalent FIR filter is about 1024 taps. Once the data is transformed into the Frequency domain, the C/D coefficients are applied and the data can either remain in the frequency domain for further processing or be transferred back into the time domain for downstream use, as is shown in FIG. 7.

If rate conversion (e.g. decimation or interpolation) is needed, the equalization coefficients ($\widetilde{\rho^{-1}}$) can be modified to be zero outside the desired passband, once this is accomplished, in the frequency domain process high frequency cells may be dropped and different IFFT size than the FFT size may be used. For example, if an 8192 FFT were used, one might use a 4096 IFFT to cause a 2 to 1 decimation to occur. It is also possible to add interpolation by adding zero frequency cells before using a larger IFFT size. It is also possible to use the structure to channelize data. To channelize data, the equalization coefficients ($\widetilde{\rho^{-1}}$) preferably are calculated for the full input passband. But then, the equalization coefficients ($\widetilde{\rho^{-1}}$) are preferably selectively chosen for the passband of interest, with other frequency cells zeroed out (this preferably occurs before the windowing process). In this case when the coefficients are applied, multiple sets of coefficients would be used to implement the set of desired output channels (see FIGS. 8A-B). More than 2 channels could be calculated, if desired.

After the coefficients are applied significant improvement can be seen on the observed image frequency rejection (i.e., the ratio between the desired sinusoid and the opposite sideband sinusoid) as well as a flattening of the transfer function's amplitude within the passband, as can be seen in the example data from the embodiment of the invention shown in FIG. 9 and FIG. 10 with example input vs output performance seen in FIGS. 2A and 2B.

Because of the use of the well-known Fast Frequency Transform, this system can result in substantial reductions in the number of required multiplications for the same level of calibration performance. Multipliers in an FFT scale as N*Log (N) while FIR filters scale as N^2.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A method for correcting spurious signals in a receiver, comprising the steps of:
   obtaining an original radio frequency (RF) signal;
   in the frequency domain, measuring in-phase (I) and quadrature (Q) signals at a plurality of frequencies within the original RF signal;
   recording I/Q imbalances in a memory storage device;
   calculating preliminary I/Q balance calibration coefficients based on the recorded I/Q imbalances;

determining a complex value for both the I and Q signals at each calibration frequency, wherein the complex values represent an amplitude and phase of both the I and Q signals;

determining a frequency-dependent vector function at each calibration frequency;

converting the frequency-dependent vector functions to the time-domain;

obtaining time-domain coefficients from the converted frequency-dependent vector functions;

converting the time-domain coefficients back to the frequency domain;

frequency reversing the frequency-dependent vector functions;

determining a frequency domain representation of an I/Q balance corrected estimation of the original signal; and correcting amplitude and phase variation in the receiver based on the I/Q balance corrected estimation of the original signal.

2. The method of claim 1, wherein a known continuous wave (CW) signal is used in calculating the preliminary I/Q balance calibration coefficients.

3. The method of claim 1, wherein the step of determining a complex value for both the I and Q signals is accomplished using real-valued Fast Fourier Transforms (FFTs).

4. The method of claim 3, wherein a sinusoid of each calibration frequency is used to select a calibration point from frequency domain data.

5. The method of claim 4, wherein the step of determining a complex value for both the I and Q signals at each calibration frequency is interpolated and extended to cover the FFT frequency range.

6. The method of claim 1, wherein the frequency-dependent vector functions are converted to the time-domain using Inverse Fast Fourier Transform (IFFT).

7. The method of claim 6, wherein the step of obtaining time-domain coefficients is accomplished with a window function that time-limits the data.

8. The method of claim 1, wherein an FFT, an overlap-and-save algorithm, or an overlap-and-add algorithm is used to determine the I/Q balance corrected estimations of the original signal.

9. The method of claim 1, further comprising determining frequency dependent amplitude variation and/or phase variation of the original signal and correct for the variations.

10. The method of claim 9, further comprising calculating equalization coefficients and determining calibration coefficients for processing and correcting the variations in the signals.

11. The method of claim 10, further comprising converting a data rate by modifying the equalization coefficients to zero outside a desired passband.

12. The method of claim 10, further comprising channelizing data by calculating the equalization coefficients for a full input passband.

13. The method of claim 12, wherein multiple sets of equalization coefficients are used to implement a set of desired output channels.

14. The method of claim 1, further comprising processing data from an analog to digital converter with the corrected amplitude and phase variation of the receiver.

15. The method of claim 14, wherein the data is processed with a Finite Impulse Response (FIR) filter using an overlap-and-save or overlap-and-add algorithm.

16. The method of claim 14, further comprising one of processing the corrected data in the frequency domain or converting the data back to the time domain.

17. A system for correcting spurious signals in a receiver, comprising:
a radio frequency signal source;
a receiver adapted to receive the calibrated signal source;
a memory storage device; and
a processor adapted to implement the method of claim 1.

18. The system of claim 17, wherein the processor is built into the receiver.

19. The system of claim 17, wherein the processor is external to the receiver and calibration is completed during assembly of the receiver.

20. The system of claim 17, wherein the receiver is a Zero-IF direct conversion receiver.

* * * * *